United States Patent
Kamiya (10) Patent No.: US 11,440,587 B2
(45) Date of Patent: Sep. 13, 2022

(54) SUSPENSION MEMBER

(71) Applicant: Toyota Jidosha Kabushiki Kaisha, Toyota (JP)

(72) Inventor: Kenta Kamiya, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 271 days.

(21) Appl. No.: 16/846,796

(22) Filed: Apr. 13, 2020

(65) Prior Publication Data

US 2020/0406971 A1 Dec. 31, 2020

(30) Foreign Application Priority Data

Jun. 27, 2019 (JP) .............................. JP2019-119817

(51) Int. Cl.
*B62D 21/00* (2006.01)
*B62D 24/02* (2006.01)

(52) U.S. Cl.
CPC .............. *B62D 21/00* (2013.01); *B62D 24/02* (2013.01)

(58) Field of Classification Search
CPC .... B62D 21/00; B62D 24/02; B60G 21/0551; B60G 2204/15; B60G 2204/1222; B60G 2206/60
USPC ........................................................ 296/203
See application file for complete search history.

(56) References Cited

U.S. PATENT DOCUMENTS

| | | | |
|---|---|---|---|
| 10,239,560 B2 * | 3/2019 | Tomikuda | B62D 21/11 |
| 2016/0152272 A1 | 6/2016 | Tomikuda et al. | |
| 2018/0009480 A1 * | 1/2018 | Kagami | B62D 29/00 |
| 2020/0307698 A1 * | 10/2020 | Kawai | B62D 21/11 |
| 2021/0070366 A1 * | 3/2021 | Innami | B62D 29/007 |
| 2021/0070369 A1 * | 3/2021 | Innami | B62D 21/11 |

FOREIGN PATENT DOCUMENTS

| | | | | |
|---|---|---|---|---|
| DE | 102016216803 A1 * | 3/2017 | ........ | B60G 21/0551 |
| JP | 2000-006833 A | 1/2000 | | |
| JP | 2008-001307 A | 1/2008 | | |
| JP | 2008001307 A * | 1/2008 | ........ | B60G 21/0551 |
| JP | 2018-176866 A | 11/2018 | | |
| JP | 2019107925 A * | 7/2019 | | |
| WO | 2015/005044 A1 | 1/2015 | | |

* cited by examiner

*Primary Examiner* — Hilary L Gutman
(74) *Attorney, Agent, or Firm* — Dinsmore & Shohl LLP

(57) ABSTRACT

A suspension member includes a cross member and front body mounts. The cross member includes a main panel including a lower panel and an upper panel joined together, and a reinforcing panel joined to the main panel. The cross member is a member including a front wall, an upper wall, a rear wall, and a lower wall, and having a closed sectional shape defined by the front wall, the upper wall, the rear wall, and the lower wall. The reinforcing panel includes a lower flange constituting a front portion of the lower wall, and an intermediate wall extending upward from a rear end of the lower flange and joined to the upper wall. On opposite sides of the cross member in a vehicle-width direction, bottom walls of the front body mounts are joined to the flange, and side walls of the front body mounts are joined to the main panel.

5 Claims, 11 Drawing Sheets

SUSPENSION MEMBER

CROSS-REFERENCE TO RELATED APPLICATIONS

This application claims priority to Japanese Patent Application No. 2019-119817 filed on Jun. 27, 2019, which is incorporated herein by reference in its entirety including the specification, drawings and abstract.

BACKGROUND

1. Technical Field

The present disclosure relates to a suspension member including a cross member extending in a vehicle-width direction.

2. Description of Related Art

A suspension member usually includes a cross member extending in a vehicle-width direction. The cross member is structured to have a high strength in order to achieve high load-bearing performance.

Japanese Unexamined Patent Application Publication No. 2008-001307 (JP 2008-001307 A) describes a cross member structured to have a closed cross-section defined by two members (referred to as an upper plate and a lower plate) extending in a vehicle-width direction. A substantially vertical reinforcing member extending in the vehicle-width direction is provided inside the closed cross-section. Further, additional members, which are called side plates, are attached respectively to opposite sides of a rear portion of the upper plate in order to reinforce the upper plate. Tower brackets (corresponding to front body mounts) are attached respectively to upper surfaces of opposite side portions of a front portion of the upper plate.

Japanese Unexamined Patent Application Publication No. 2018-176866 (JP 2018-176866 A) describes a cross member structured to have a closed cross-section defined by two members (referred to as a lateral upper member and a lateral lower member) extending in a vehicle-width direction. The cross member further includes two members (referred to as a rear upper member and a rear lower member) extending in the vehicle-width direction and provided rearward of the closed cross-section, so that another closed cross-section is defined by the two members (the rear upper member and the rear lower member). At opposite sides of a front portion of the cross member, mount members (corresponding to front body mounts) are attached to the lateral upper member.

SUMMARY

As described in JP 2008-001307 A and JP 2018-176866 A, complicated structures have been adopted to ensure adequate strength of the cross members.

If the structure of a cross member is made complicated, the manufacturing cost increases. In an engine vehicle in which a cross member supports an engine, resonance between the cross member and the engine may occur, so that some attention is required.

The present disclosure provides a suspension member that includes a cross member having a simple structure and that has an adequate strength of joining between the cross member and a body mount.

An aspect of the present disclosure relates to a suspension member provided in a vehicle and including a cross member and body mounts. The cross member includes a main panel and a reinforcing panel that have been joined together. The cross member is a member including a front wall, an upper wall, a rear wall, and a lower wall and having a closed sectional shape defined by the front wall, the upper wall, the rear wall, and the lower wall. The reinforcing panel includes a flange that constitutes a part of the lower wall, and an intermediate wall that extends upward from a rear end of the flange and that is joined to the upper wall. On opposite sides of the cross member in a vehicle-width direction, bottom walls of the body mounts are joined to the flange of the reinforcing panel, and side walls of the body mounts are joined to the main panel.

In the suspension member according to the aspect of the present disclosure, the body mounts may be front body mounts provided at a front portion of the cross member, the flange of the reinforcing panel may constitute a front portion of the lower wall, and the intermediate wall of the reinforcing panel may be disposed rearward of rear walls of the front body mounts, at all positions between the front body mounts disposed on the opposite sides of the cross member.

In the suspension member according to the aspect of the present disclosure, a front end of the flange of the reinforcing panel may be disposed forward of rear side surfaces of the front body mounts, at all the positions between the front body mounts disposed on the opposite sides of the cross member.

In the suspension member according to the aspect of the present disclosure, the flange of the reinforcing panel may constitute a front portion of the lower wall, and the main panel may include the front wall, the upper wall, the rear wall, and a rear portion of the lower wall. A portion of the flange of the reinforcing panel, the portion of the flange being near the rear end of the flange, may be joined to a portion of the rear portion of the lower wall of the main panel, the portion of the rear portion of the lower wall being near a front end of the rear portion of the lower wall. A portion of the flange of the reinforcing panel, the portion of the flange being near a front end of the flange, may be joined to a portion of the front wall of the main panel, the portion of the front wall being near a lower end of the front wall.

The suspension member according to the aspect of the present disclosure may further includes body mount brackets joined respectively to front side surfaces of the body mounts. The body mount brackets may be joined to the main panel and the reinforcing panel.

According to the aspect of the present disclosure, it is possible to provide a suspension member including a cross member having a structure simpler than that of a conventional suspension member. Further, it is possible to join body mounts to a cross member with a sufficient strength.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, example embodiments will be described with reference to the accompanying drawings. In the following description, specific configurations will be presented to facilitate the understanding, but these configurations are merely examples of the embodiments, and various other embodiments may be implemented.

Figure 1:
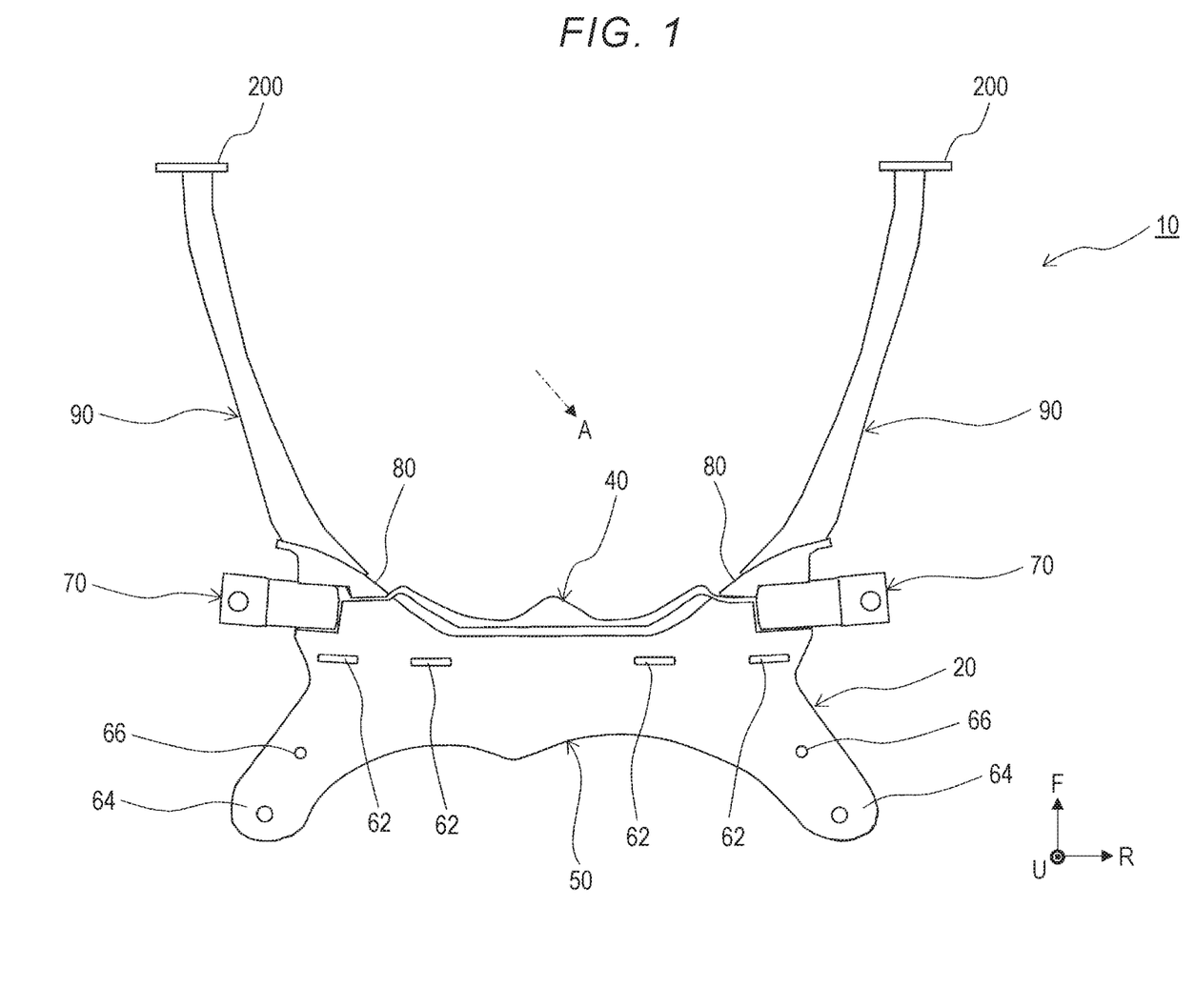
FIG. 1 is a schematic plan view of a suspension member according to an embodiment.

FIG. 1 is a schematic plan view of a suspension member 10 provided in a front portion of a vehicle according to an embodiment. In a coordinate system in FIG. 1, an axis F indicates a forward direction of the vehicle, an axis U indicates an upward direction of the vehicle, and an axis R indicates a right-hand direction of an occupant of the vehicle (the same applies to the following drawings).

The suspension member 10 includes a cross member 20, which is a structural member extending in a vehicle-width direction. The suspension member 10 further includes front body mounts 70 provided respectively on opposite sides of a front portion of the cross member 20, body mount brackets 80 provided respectively on front surfaces of the front body mounts 70, and side rails 90 attached respectively to front surfaces of the body mount brackets 80.

Each of the cross member 20, the front body mount 70, the body mount bracket 80, and the side rail 90 is a member formed by processing a metal plate, such as a steel plate. In particular, the cross member 20, the front body mounts 70, and the side rails 90 are members that function mainly to transmit loads associated with the weight, acceleration and deceleration, a collision, and so forth of the vehicle, and are also referred to as structural members, framework members, frames, or the like.

The cross member 20 is formed by joining a reinforcing panel 40, an upper panel 50, and so forth by welding, such that the cross member 20 has a closed cross-section. When a member having a closed cross-section is cut by a plane perpendicular to a longitudinal direction of the member (the vehicle-width direction, in the case of the cross member 20), the entire periphery of the cross-section is defined by the member and the inside of the cross-section is hollow.

Through-holes 62 having an elongated shape and extending in the vehicle-width direction are provided in the upper panel 50 that constitutes an upper surface of the cross member 20. The through-holes 62 are provided in order to weld the upper panel 50 and the reinforcing panel 40 together, as described later.

Rear body mounts 64 each having a through-hole are provided respectively on opposite sides of a rear portion of the upper panel 50. The rear body mounts 64 and the front body mounts 70 support side members, which are main framework members of a body, at their upper surfaces (at the upper surfaces of the rear body mounts 64 and the upper surfaces of the front body mounts 70).

On opposite sides of the upper panel 50, lower arm second attachment portions 66 are provided forward of the rear body mounts 64, respectively. The lower arm second attachment portions 66 are portions to which lower arms are respectively attached. The lower arm is attached a lower arm first attachment portion (not illustrated) provided near a lower surface of the front body mount 70, and the lower arm second attachment portion 66. The lower arms are members that are respectively provided on opposite sides of the cross member 20. A front wheel, a suspension, and so forth (not illustrated) are attached to the lower arm.

Further, the cross member 20 supports an engine (not illustrated) of the vehicle. The engine is disposed on a center front side of the cross member 20. The cross member 20 supports a lower surface of a rear portion of the engine with the use of a torque rod (not illustrated). Note that, the vehicle according to the present embodiment is not limited to an engine-driven vehicle and may be, for example, a motor-driven electric vehicle.

Each front body mount 70 is a member that supports the body disposed above the front body mount 70. In the present embodiment, it is assumed that each front body mount 70 is a member having a rectangular tube shape, which is formed by assembling bent steel plates. The front body mounts 70 are provided respectively on the opposite sides of the front portion of the cross member 20. The front body mounts 70 extend upward and outward. In a region above each front body mount 70, a front side member, which is a structural member of the body, extends in a front-rear direction such that the front side member is disposed at a distance from the front body mount 70. The front body mount 70 is configured to support the front side member. Since the front body mount 70 is disposed forward of (in front of) the rear body mount 64, such a name is given to the front body mount 70. Both the front body mount 70 and the rear body mount 64 are body mounts that support the body disposed above the front body mount 70 and the rear body mount 64. The number of body mounts is not limited to any particular number. For example, only a pair of right and left body mounts may be provided near the cross member 20.

Each body mount bracket 80 is a member that supports the front surface side of the front body mount 70. In the present embodiment, the body mount bracket 80 is used also as an attachment portion to which the side rail 90 is attached.

As viewed from above, each side rail 90 is an elongated member having a substantially linear shape. A rear end of the side rail 90 is joined to the body mount bracket 80 by welding or the like. The side rail 90 is slightly inclined toward the outside in the vehicle-width direction as the side rail 90 extends forward. A plate member 200 provided at a front portion of the vehicle is joined to a front end of the side rail 90 by welding or the like. A crash box (not illustrated) is provided forward of the plate member 200, and a front bumper reinforcement (not illustrated) and so forth are provided forward of the crash box. In the event of a front-end collision of the vehicle, a high load transmitted through the front bumper reinforcement, the crash box, and the plate member 200 is input into the side rail 90 from its front end, and the side rail 90 transmits the load to the cross member 20.

In addition to a load from the side rail 90, a load transmitted through the front body mount 70 and the rear body mount 64 is input into the cross member 20. Further, a load from the lower arm is input into the cross member 20 via the lower arm first attachment portion and the lower arm second attachment portion 66. Furthermore, in the case of an engine vehicle, the cross member 20 supports the engine. Thus, the cross member 20 is configured to have a sufficiently high strength.

It should be noted that FIG. 1 and the following drawings are simply illustrated for the purpose of illustrating a main shape and structure of the suspension member 10 including the cross member 20. For example, the upper panel 50 of the cross member 20 has projections and depressions (not illustrated), and thus the structure is reinforced. Further, another member may be provided, for example, a bracket may be attached to each rear body mount 64.

Figure 2:
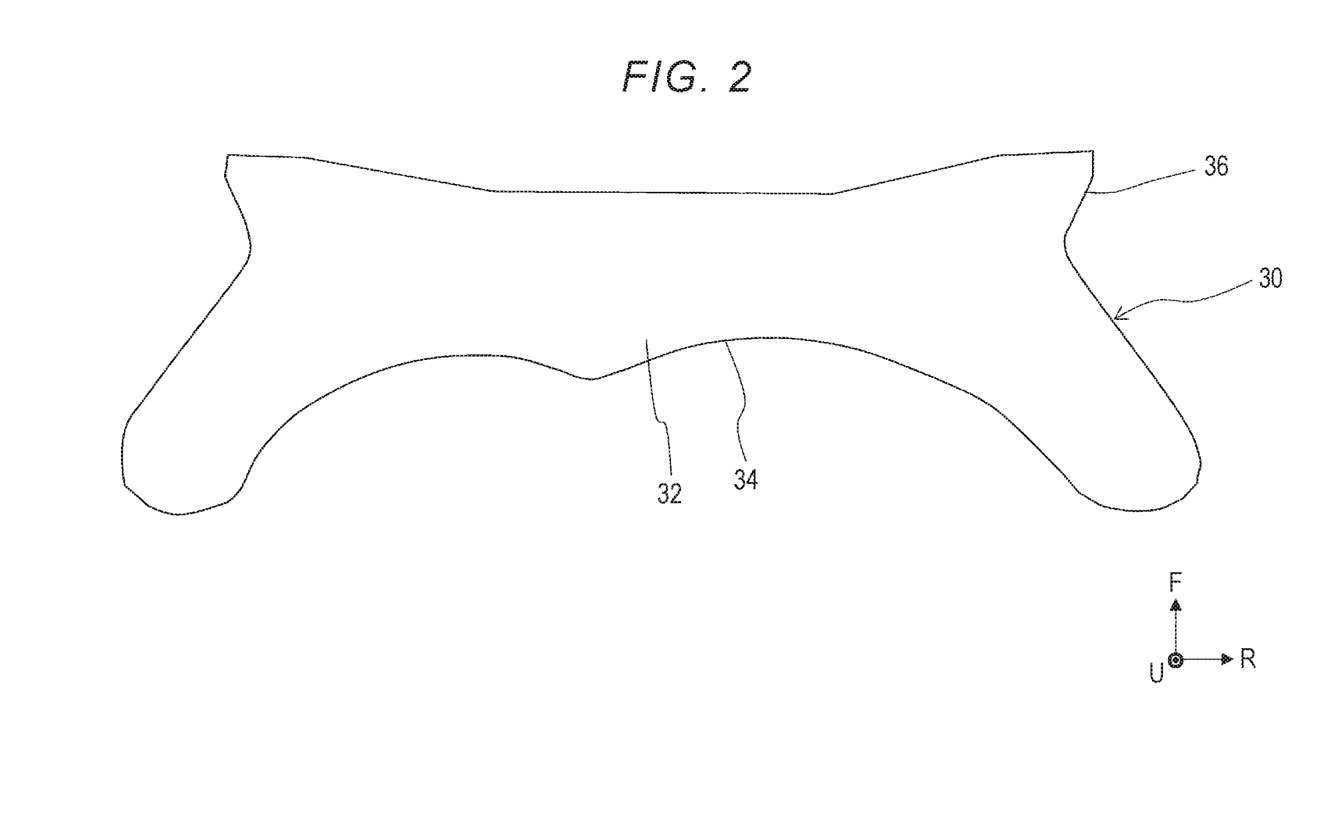
FIG. 2 is a plan view of a lower panel included in a cross member.
Figure 3:
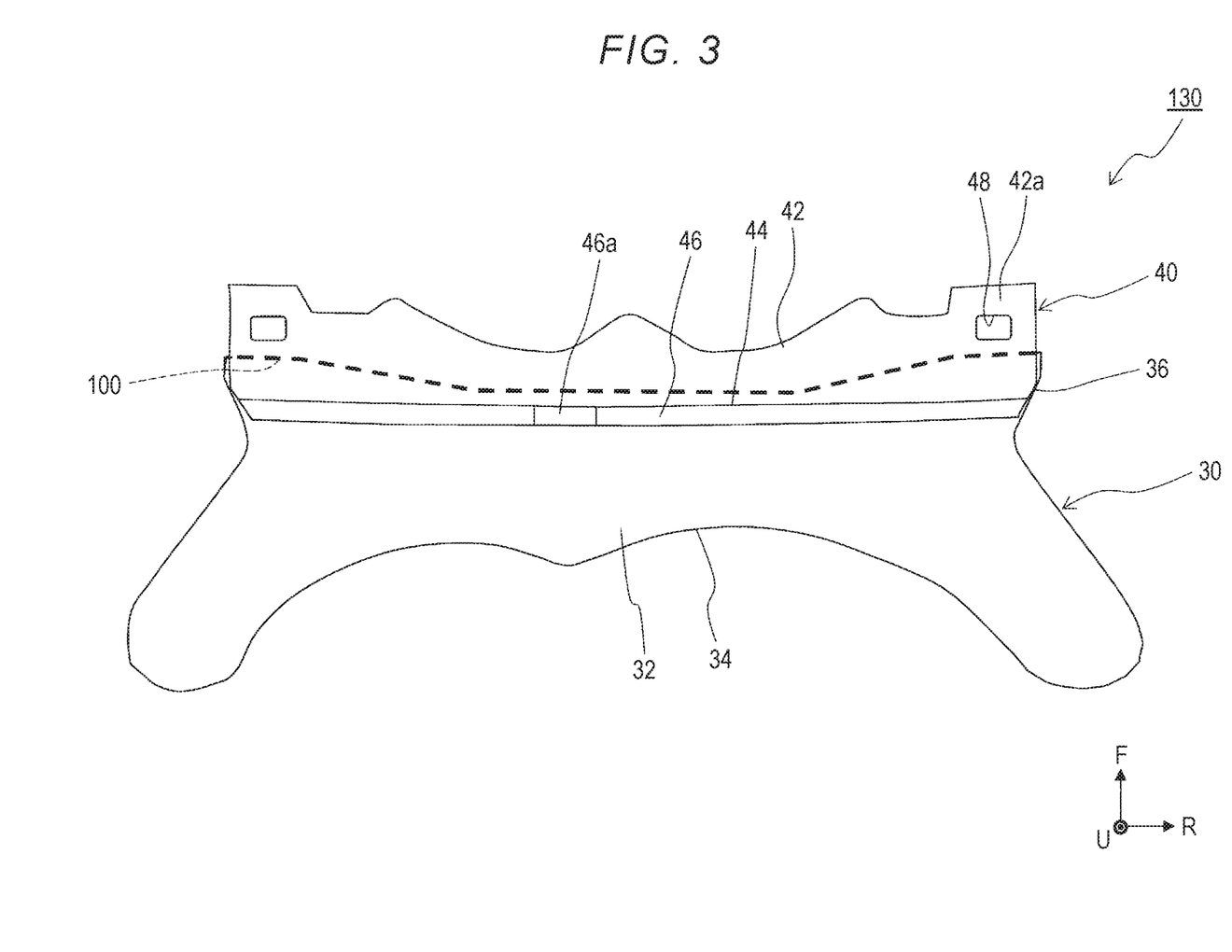
FIG. 3 is a plan view of an assembly of the lower panel and a reinforcing panel.
Figure 4:
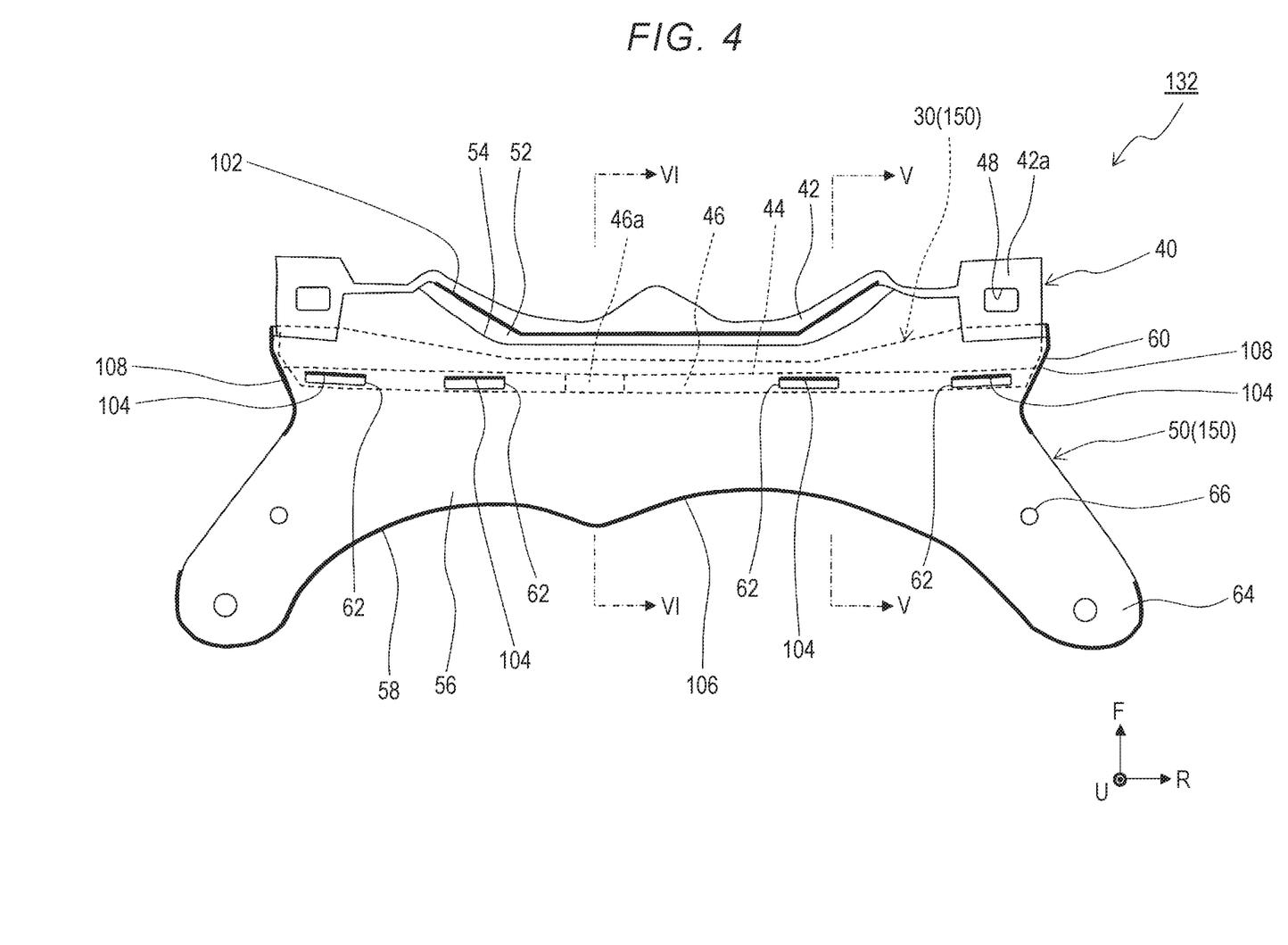
FIG. 4 is a plan view of an assembly of the lower panel, the reinforcing panel, and an upper panel.
Figure 5:
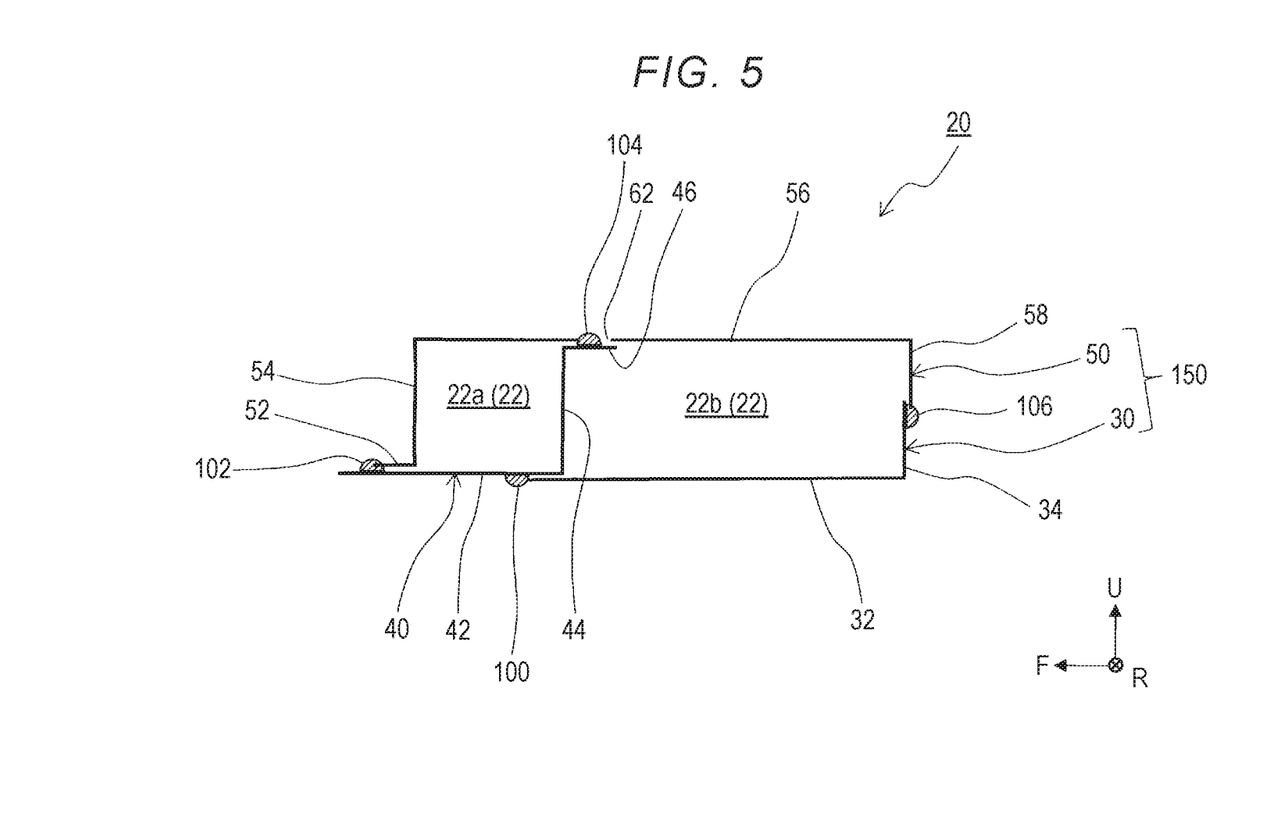
FIG. 5 is an end view of the cross member taken along line V-V in FIG. 4.
Figure 6:
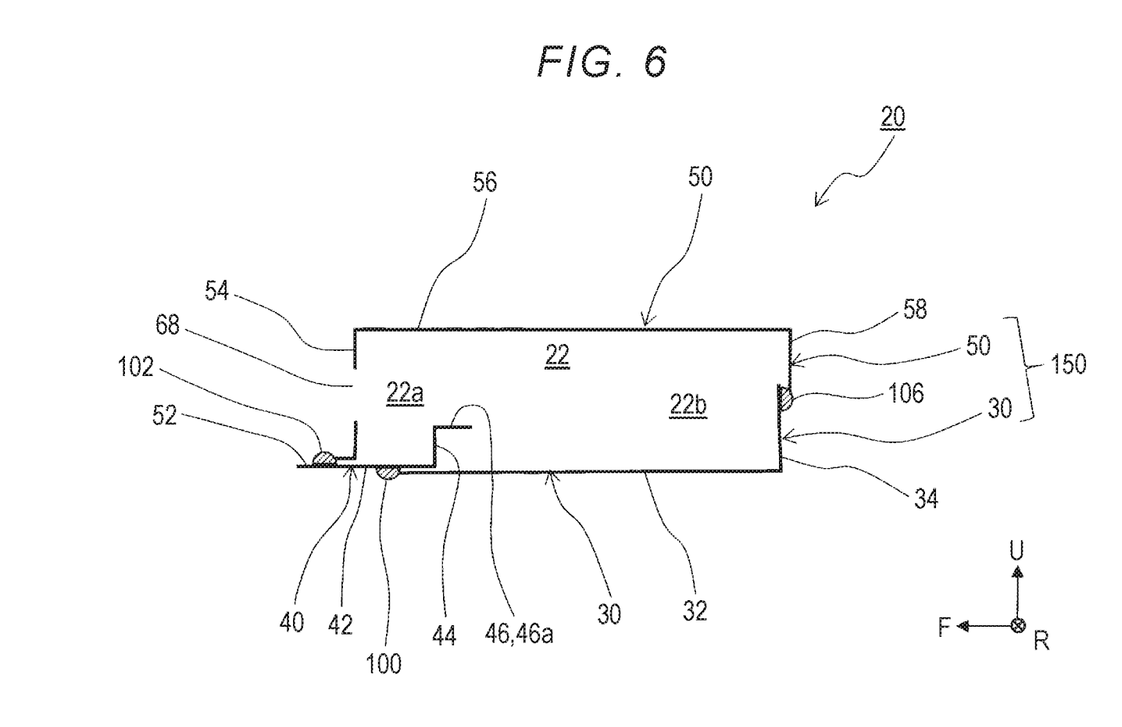
FIG. 6 is an end view of the cross member taken along line VI-VI in FIG. 4.

Subsequently, the basic structure of the cross member 20 will be described in detail with reference to FIG. 2 to FIG. 6. FIG. 2 to FIG. 4 are exploded views of the cross member 20. FIG. 2 is a plan view of a lower panel 30 included in the cross member 20. FIG. 3 is a plan view of an assembly of the reinforcing panel 40 and the lower panel 30. FIG. 4 is a plan view of an assembly of the upper panel 50, the lower panel 30, and the reinforcing panel 40. FIG. 5 is an end view of the cross member 20 taken along line V-V in FIG. 4. FIG. 6 is an end view of the cross member 20 taken along line VI-VI in FIG. 4. Note that an end view means a view that illustrates only an end plane shape and that does not illustrate shapes of portions located on the deeper side with respect to the end plane).

The lower panel 30 illustrated in FIG. 2 is a member that constitutes, for example, a lower wall of a rear portion of the cross member 20. The lower panel 30 is formed by pressing a metal plate, such as a steel plate. The shape of the lower panel 30 in a plan view is substantially the same as the shape of the rear portion of the upper panel 50 illustrated in FIG. 1. The lower panel 30 includes a lower wall 32 that is substantially flat, a rear wall 34 extending upward from a rear end of the lower wall 32, and side walls 36 extending upward from side ends of a front portion of the lower wall 32 (refer also to FIG. 5, FIG. 6 and FIG. 7).

FIG. 3 illustrates an assembly 130 including the lower panel 30 and the reinforcing panel 40 that have been assembled and joined together. The reinforcing panel 40 is a member formed by pressing a metal plate, such as a steel plate. The shape of the reinforcing panel 40 in a plan view is substantially the same as the shape of a front portion of the upper panel 50 illustrated in FIG. 1. The reinforcing panel 40 includes a lower flange 42 that is a substantially flat lower wall, an intermediate wall 44 extending upward from a rear end of the lower flange 42, and an upper flange 46 that is a substantially flat upper wall extending rearward from an upper end of the intermediate wall 44 (refer also to FIG. 5, FIG. 6 and FIG. 7).

The upper flange 46 of the reinforcing panel 40 includes a low wall portion 46a. The low wall portion 46a is at a position slightly leftward from the center of the upper flange 46 in the vehicle-width direction. The low wall portion 46a is lower than the remaining portion of the upper flange 46. The torque rod is disposed on the low wall portion 46a.

Opposite side portions of a front portion of the lower flange 42 are extending portions 42a extending to positions outward of the shape of the upper panel 50. A through-hole 48 is provided in each of the extending portions 42a. The through-hole 48 is a portion to be used as the lower arm first attachment portion, and is also a portion at which the front body mount 70 is welded.

The reinforcing panel 40 is assembled to the lower panel 30 in a state where a lower surface of a portion of the lower flange 42, which is near the rear end of the lower flange 42, is overlapped with an upper surface of a portion of the lower wall 32 of the lower panel 30, which is near a front end of the lower wall 32. A bold dashed line in FIG. 3 indicates a welded portion 100 that is a welded junction between the front end of the lower wall 32 of the lower panel 30 and the lower surface of the lower flange 42 of the reinforcing panel 40. The welding performed at the welded portion 100 may be, for example, arc welding.

Although the front body mounts 70 illustrated in FIG. 1 are not illustrated in FIG. 3, the reinforcing panel 40 has such a shape that the strength between the front body mounts 70 respectively provided on the opposite sides of the cross member 20 can be secured. Specifically, the intermediate wall 44 of the reinforcing panel 40 is located rearward of rear side walls of the front body mounts 70, at all the positions between the front body mounts 70 respectively provided on the opposite sides of the cross member 20. Further, a front end of the lower flange 42 of the reinforcing panel 40 is located forward of rear side surfaces of the front body mounts 70, at all the positions between the front body mounts 70 respectively provided on the opposite sides of the cross member 20.

FIG. 4 illustrates an assembly 132 that is newly formed by assembling the upper panel 50 to the assembly 130 of the lower panel 30 and the reinforcing panel 40 illustrated in FIG. 3. The upper panel 50 is a member formed by pressing a metal plate, such as a steel plate. The upper panel 50 includes a lower wall 52 that is a flat front portion of the upper panel 50, a front wall 54 extending upward from a rear end of the lower wall 52, and an upper wall 56 that is a substantially flat wall extending rearward from an upper end of the front wall 54. Further, a rear wall 58 extends downward from a rear end of the upper wall 56, and side walls 60 extend in the up-down direction from side ends of a front portion of the upper wall 56.

A lower surface of the lower wall 52 of the upper panel 50 is overlapped with an upper surface of the lower flange 42 of the reinforcing panel 40, at a position slightly rearward of the front end of the lower flange 42. As indicated by a bold line, a front end of the lower wall 52 of the upper panel 50 is joined, at a welded portion 102, to the upper surface of the reinforcing panel 40.

A lower surface of the upper wall 56 of the upper panel 50 is overlapped with an upper surface of the upper flange 46 of the reinforcing panel 40. Then, a front edge of the through-hole 62 provided in the upper panel 50 is joined, at a welded portion 104, to the upper surface of the upper flange 46 of the reinforcing panel 40.

A front surface of a portion of the rear wall 58 the upper panel 50, which is near a lower end of the rear wall 58, is overlapped with a rear surface of a portion of the rear wall 34 of the lower panel 30, which is near an upper end of the rear wall 34. Then, the lower end of the rear wall 58 of the upper panel 50 is joined, at a welded portion 106, to the rear surface of the rear wall 34 of the lower panel 30.

An inner surface of a portion of each side wall 60 of the upper panel 50, which is near a lower end of the side wall 60, is overlapped with an outer surface of a portion of the corresponding side wall 36 of the lower panel 30, which is near an upper end of the side wall 36. Then, the lower end of each side wall 60 of the upper panel 50 is joined, at a welded portion 108, to the outer surface of the corresponding side wall 36 of the lower panel 30.

FIG. 5 is a schematic end view of the cross member 20 taken along line V-V in FIG. 4. In this end view of the cross member 20, the lower panel 30, the reinforcing panel 40, and the upper panel 50 are joined together at the welded portions 100, 102, 104, 106.

Thus, the cross member 20 has a large closed cross-sectional structure that surrounds a hollow portion 22. The lower flange 42 of the reinforcing panel 40 constitutes a front portion of a lower wall of the large closed cross-sectional structure, and the lower wall 32 of the lower panel 30 constitutes a rear portion of the lower wall of the large closed cross-sectional structure. The front wall 54 of the upper panel 50 constitutes a front wall of the large closed cross-sectional structure. The rear wall 34 of the lower panel 30 constitutes a lower portion of a rear wall of the large closed cross-sectional structure, and the rear wall 58 of the upper panel 50 constitutes an upper portion of the rear wall of the large closed cross-sectional structure. The upper wall 56 of the upper panel 50 constitutes an upper wall of the large closed cross-sectional structure.

Inside the large closed cross-sectional structure, the intermediate wall 44 of the reinforcing panel 40 connects the upper wall and the lower wall to each other, thereby reinforcing the large-cross-sectional structure. The hollow portion 22 is partitioned by the intermediate wall 44 into a front hollow portion 22a and a rear hollow portion 22b.

As is clear from FIG. 5, the lower panel 30, the reinforcing panel 40, and the upper panel 50 are provided so as not to be overlapped with each other, except for the vicinities of the welded portions 100, 102, 104, 106. Thus, the structure of the cross member 20 is simplified, and the weight of the cross member 20 is reduced. Note that, in order to strengthen the front portion of the cross member 20, the lower wall 32 of the lower panel 30 may extend further forward. For example, the front end of the lower wall 32 may extend to a position forward of the front wall 54 of the upper panel 50. As is clear from FIG. 5, welding at the welded portions 100, 102, 104, 106 may be performed from outside the cross member 20, and the welding process is simplified.

The name of the reinforcing panel 40 is given from the viewpoint that the reinforcing panel 40 is a plate-shaped member that reinforces an assembly of the lower panel 30 and the upper panel 50 (hereinafter, referred to as "main panel 150"). Note that, all the lower panel 30, the reinforcing panel 40, and the upper panel 50 are members of the cross member 20. That is, the reinforcing panel 40 has the same importance as that of the lower panel 30 and the upper panel 50.

The configuration of the main panel 150 may be variously set. For example, the main panel 150 may be formed by deforming a single panel, or may be formed by combining two panels as in the above-described example. Alternatively, three or more panels may be combined together to form the main panel 150.

Among these configurations, the configuration in which the main panel 150 is formed by combining two panels has features, such as a sufficiently high strength, a great ease in processing, and a simple configuration. In this case, the proportion between the lower panel 30 and the upper panel 50, which constitute the main panel 150, in its height direction may be changed as needed. For example, only one of the lower panel 30 and the upper panel 50 may constitute the rear wall of main panel 150. The shapes of the lower panel 30 and the upper panel 50 may be determined in consideration of the ease of press working and the ease of a joining process.

The thickness of each of the lower panel 30, the reinforcing panel 40, and the upper panel 50 may be variously set, and is selected based on a required strength. For example, all the lower panel 30, the reinforcing panel 40, and the upper panel 50 may have the same thickness. Alternatively, the lower panel 30 and the upper panel 50 may have the same thickness, and the thickness of the reinforcing panel 40 may be set to be greater or less than the thickness of the lower panel 30 and the upper panel 50.

FIG. 6 is a schematic end view of the cross member 20 taken along line VI-VI in FIG. 4. As a matter of course, in this end plane as well, the cross member 20 is formed by assembling the lower panel 30 and the upper panel 50, which constitute the main panel 150, with the reinforcing panel 40.

The end plane of the cross member 20 illustrated in FIG. 6 is basically similar to the end plane of the cross member 20 illustrated in FIG. 5. However, in the end plane illustrated in FIG. 6, a through-hole 68 through which the torque rod passes is provided in the front wall 54 of the upper panel 50. Further, in the end plane illustrated in FIG. 6, the intermediate wall 44 of the reinforcing panel 40 is set to be low, and the upper flange 46 constitutes the low wall portion 46a. The torque rod extends on an upper surface of the low wall portion 46a, in the hollow portion 22. The torque rod is fixed to the cross member 20, extends forward through the through-hole 68, and is attached to the engine (not illustrated).

In the end plane taken along line VI-VI, the intermediate wall 44 of the reinforcing panel 40 does not reach the upper wall, inside the cross member 20. However, the shape of the cross member 20 in the end plane taken along line VI-VI is exceptional, and the shape of the cross member 20 in the end plane taken along line VI-VI exerts a small influence on the overall strength of the cross member 20.

Next, the structure of a portion of the cross member 20, which is near the right side of a front portion of the cross member 20, will be described with reference to FIG. 7 to FIG. 11. Each of FIG. 7 to FIG. 11 schematically illustrates a partial shape of the cross member 20 and so forth as viewed in a direction A in FIG. 1, and illustrates the structure of the cross member 20 in an exploded view.

Figure 7:
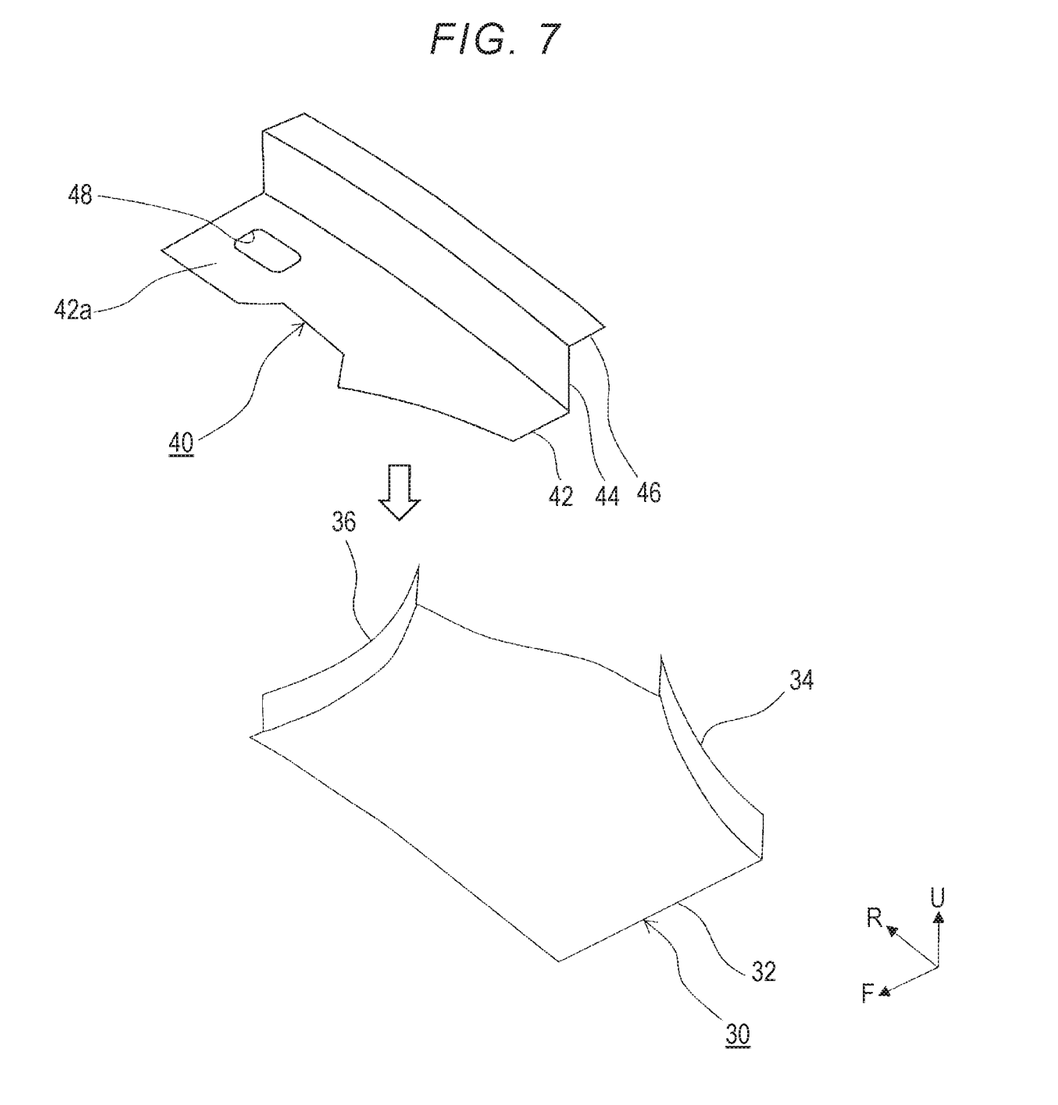
FIG. 7 is a partially exploded view of the lower panel and the reinforcing panel as viewed in a direction A in FIG. 1.

FIG. 7 illustrates a part of the lower panel 30 and a part of the reinforcing panel 40 in an exploded state. In the view of the lower panel 30, the lower wall 32, the rear wall 34, and the side wall 36 are partially illustrated. In the view of the reinforcing panel 40, the lower flange 42, the intermediate wall 44, and the upper flange 46 are partially illustrated. Regarding the lower flange 42 of the reinforcing panel 40, the extending portion 42a provided in a right side portion of a front end portion of the lower flange 42 and the through-hole 48 are also illustrated.

Figure 8:
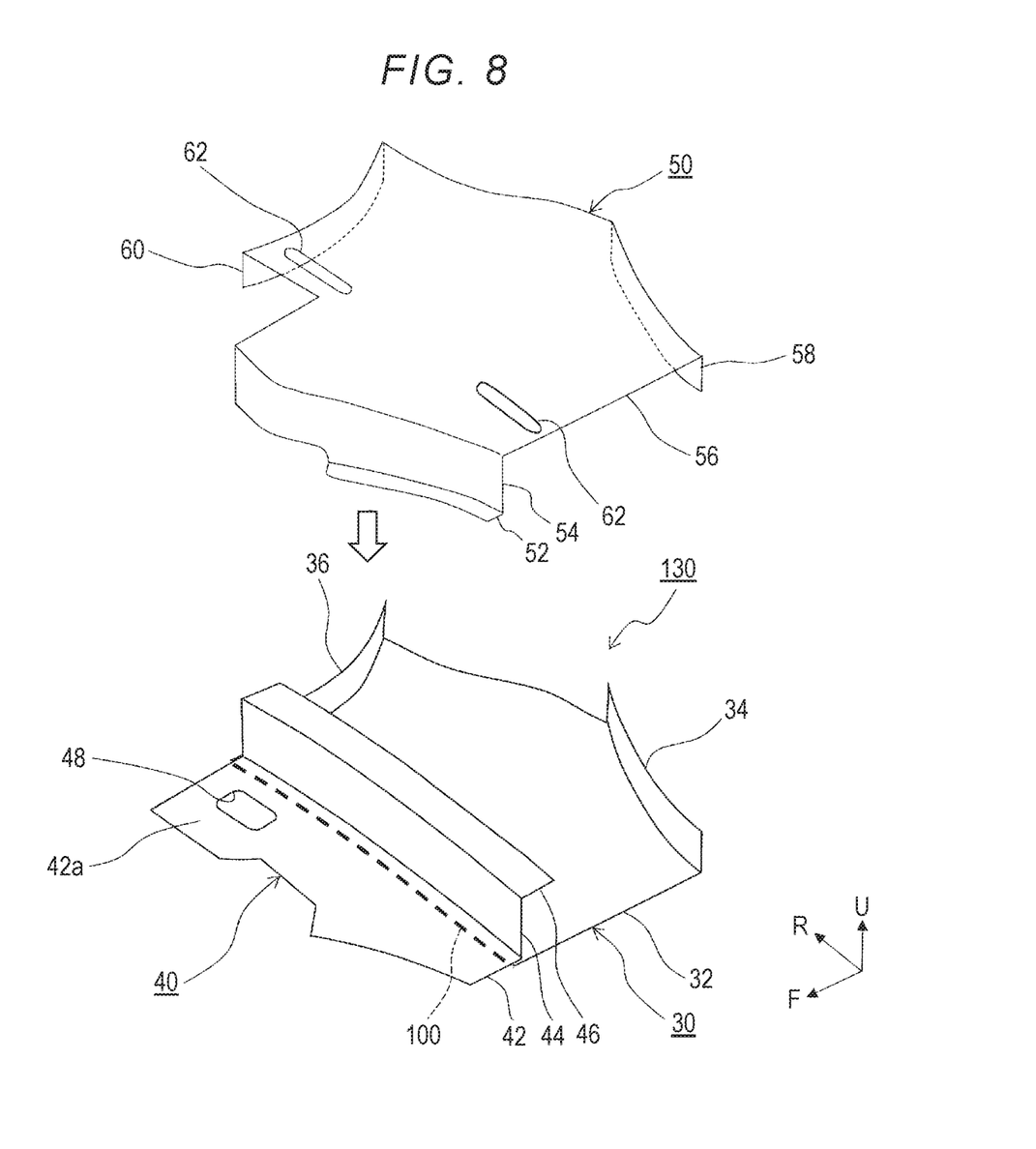
FIG. 8 is a partially exploded view illustrating the upper panel in addition to the structural members illustrated in FIG. 7.

FIG. 8 illustrates the assembly 130 of the lower panel 30 and the reinforcing panel 40 that are illustrated in FIG. 7 and that have been assembled together, and also illustrates the upper panel 50. In the assembly 130, the lower surface of the portion of the lower flange 42 of the reinforcing panel 40, which is near the rear end of the lower flange 42, and the upper surface of the portion of the lower wall 32 of the lower panel 30, which is near the front end of the lower wall 32, are overlapped with each other and fixed together by the welded portion 100.

The lower wall 52, the front wall 54, the upper wall 56, the rear wall 58, and the side wall 60 of the upper panel 50 are illustrated. Two through-holes 62 having an elongated shape in the vehicle-width direction are provided in the upper wall 56.

Figure 9:
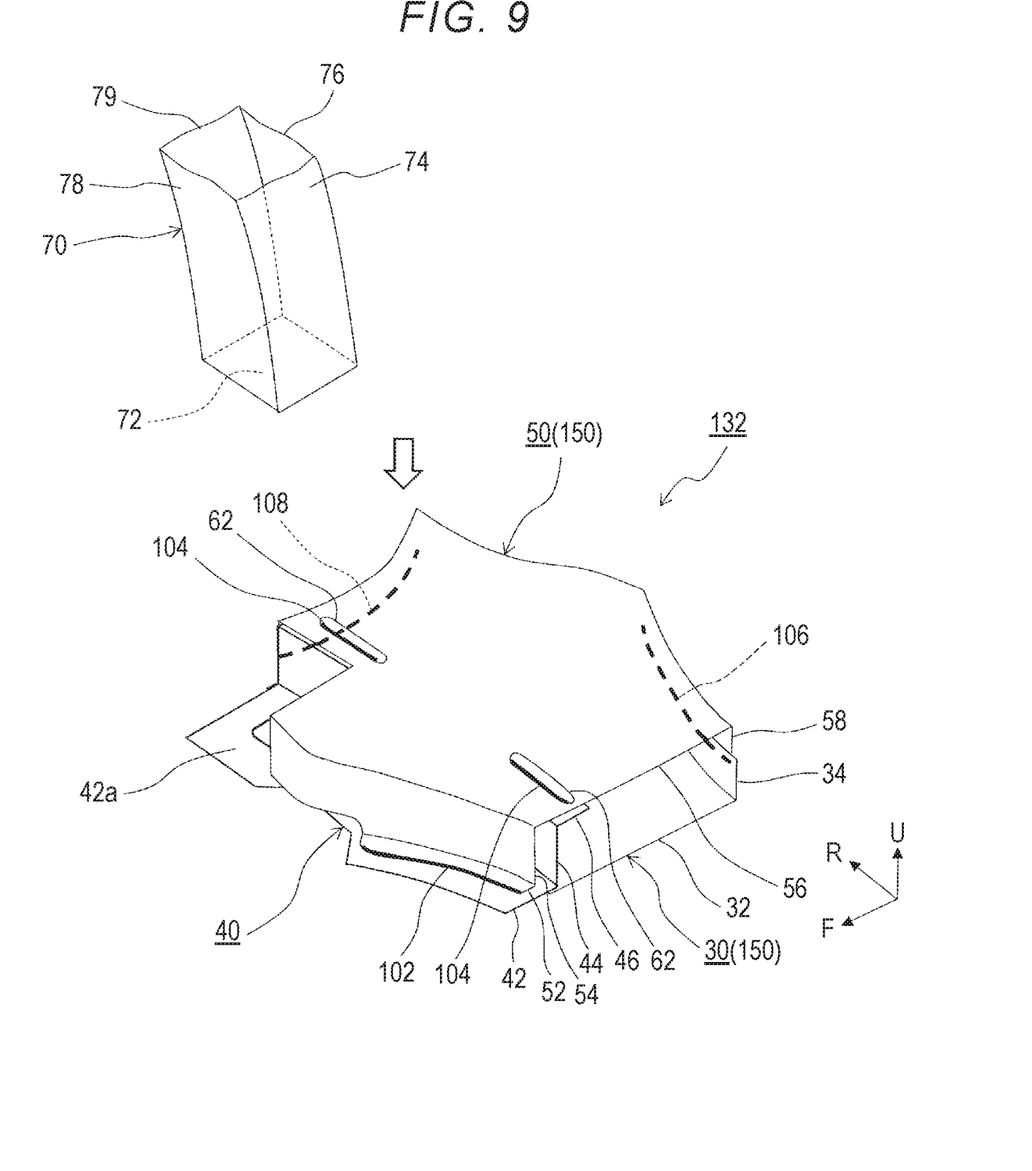
FIG. 9 is a partially exploded view illustrating a front body mount in addition to the structural members illustrated in FIG. 8.

FIG. 9 is an exploded view subsequent to FIG. 8, and illustrates the assembly 132 of the upper panel 50 and the assembly 130 illustrated in FIG. 8, which have been assembled together, and also illustrates the front body mount 70. In the assembly 132, the upper panel 50 is fixed by the welded portions 102, 104, 106, 108. The welded portion 102 is a welded junction between the lower wall 52 of the upper panel 50 and the lower flange 42 of the reinforcing panel 40. The welded portions 104 are welded junctions between the front edges of the through-holes 62 provided in the upper wall 56 of the upper panel 50 and the upper flange 46 of the reinforcing panel 40. The welded portion 106 is a welded junction between the rear wall 58 of the upper panel 50 and the rear wall 34 of the lower panel 30. The welded portion 108 is a welded junction between the side wall 60 of the upper panel 50 and the side wall 36 of the lower panel 30.

As illustrated in FIG. 9, a lower portion of the front body mount 70 has a hollow closed cross-sectional structure surrounded by a bottom wall 72 having a substantially square shape and four side walls 74, 76, 78, 79 extending upward respectively from the four sides of the bottom wall 72. The closed cross-sectional structure of the front body mount 70 may be formed, for example, by joining two metal plates, such as pressed steel plates, by welding.

Figure 10:
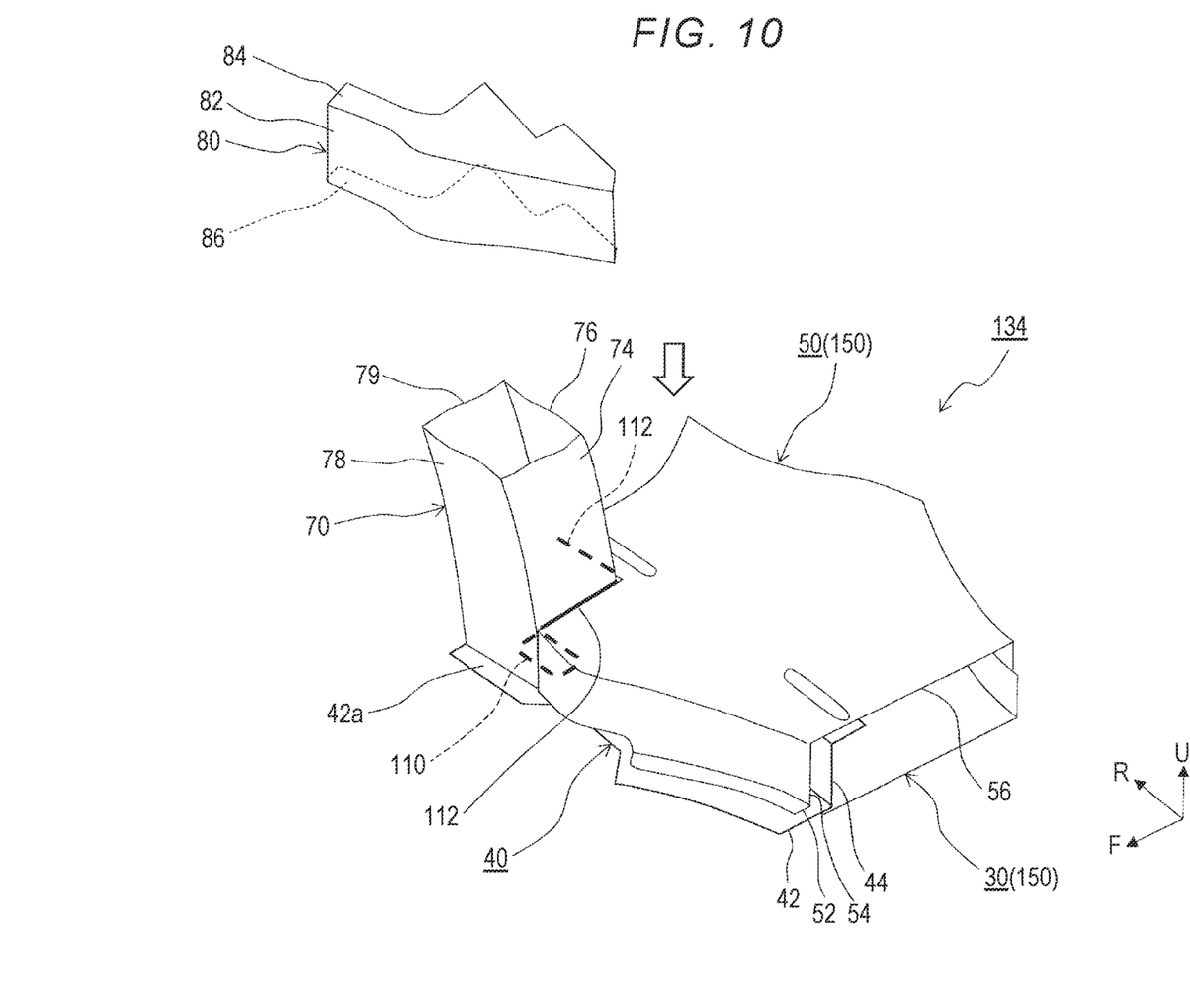
FIG. 10 is a partially exploded view illustrating a body mount bracket in addition to the structural members illustrated in FIG. 9.

FIG. 10 is an exploded view subsequent to FIG. 9. A lower part of FIG. 10 illustrates an assembly 134 of the front body mount 70 and the assembly 132 illustrated in FIG. 9, which have been assembled together. A lower surface of the bottom wall 72 of the front body mount 70 is overlapped with an upper surface of the extending portion 42a of the reinforcing panel 40. Then, a peripheral edge portion of the through-hole 48 of the extending portion 42a and the lower surface of the bottom wall 72 of the front body mount 70 are joined together by a welded portion 110. Among the four side walls 74, 76, 78, 79 of the front body mount 70, the side wall 74 that is a left side wall in the vehicle-width direction (an inner side wall in the vehicle-width direction) and the side wall 76 that is a rear side wall in the vehicle front-rear direction are joined to a right end portion of the front portion of the upper panel 50 by a welded portion 112. Since the upper panel 50 is a part of the main panel 150, it can be said that the side walls 74, 76 of the front body mount 70 are joined to the main panel 150.

In the present embodiment, it is assumed that the intermediate wall 44 of the reinforcing panel 40 and the side wall 76 of the front body mount 70 face each other with a slight distance kept therebetween and are not welded together. The reinforcing panel 40 is firmly joined to the front body mount 70 by welding the lower flange 42 to the bottom wall 72 of the front body mount 70.

The body mount bracket 80 is illustrated in an upper part of FIG. 10. The body mount bracket 80 is formed by pressing a metal plate, such as a steel plate. The body mount bracket 80 includes a front wall 82, and an upper wall 84 and a lower wall 86 that extend rearward respectively from an upper end and a lower end of the front wall 82.

Figure 11:
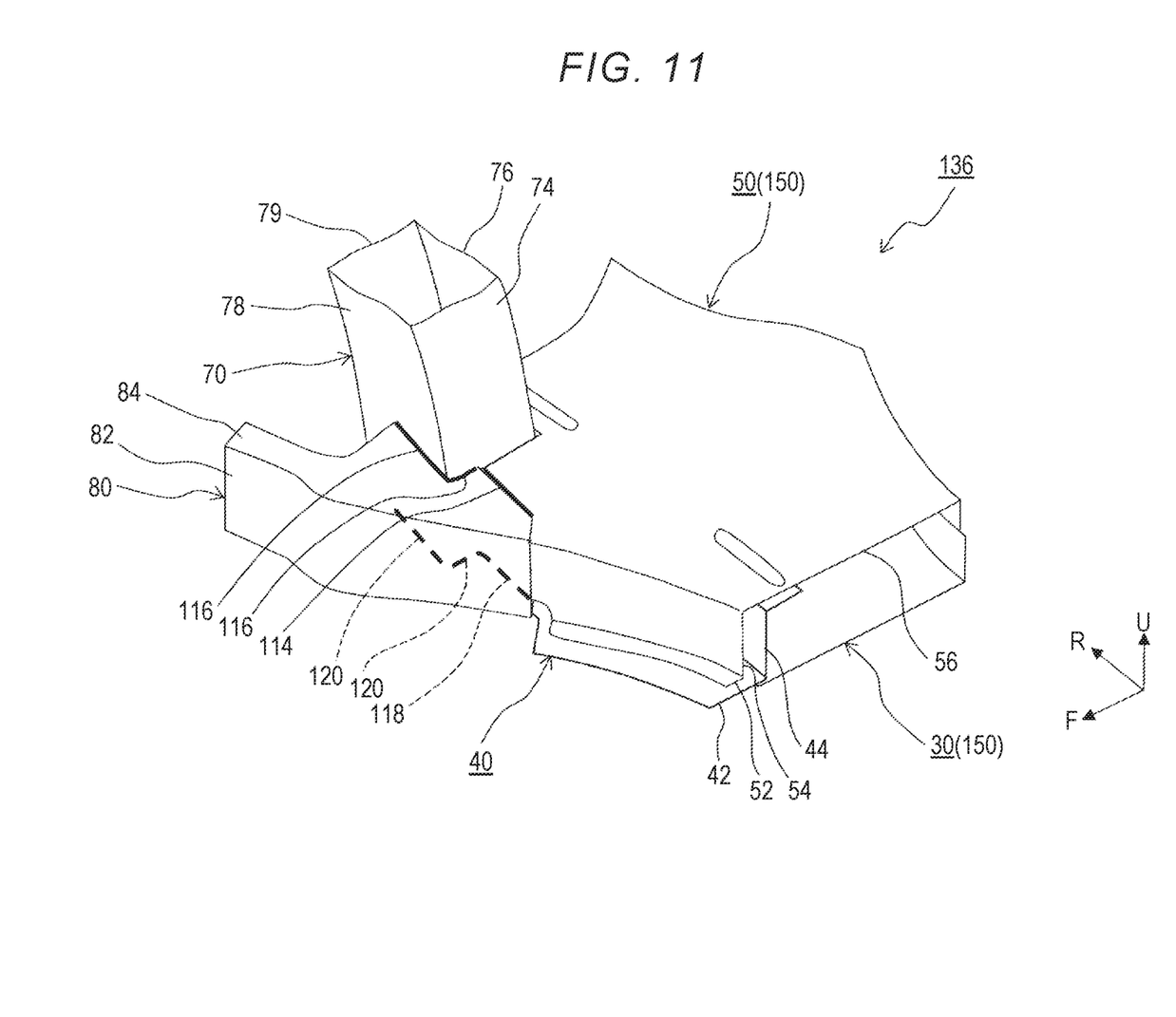
FIG. 11 is a view illustrating a state where the structural members illustrated in FIG. 10 have been assembled together.

FIG. 11 is an exploded view subsequent to FIG. 10. FIG. 11 illustrates an assembly 136 of the body mount bracket 80 and the assembly 134 illustrated in FIG. 10, which have been assembled together. A lower surface of the upper wall 84 of the body mount bracket 80 is overlapped with an upper surface of a right side portion of a front portion of the upper wall 56 of the upper panel 50. A rear end of the upper wall 84 is joined to the upper wall 56 of the upper panel 50 by a welded portion 114. Since the upper panel 50 is a part of the main panel 150, it can be said that the body mount bracket 80 is joined to the main panel 150. In addition, an end portion of the upper wall 84 of the body mount bracket 80 is joined, by a welded portion 116, to the side wall 74 of the front body mount 70, which faces inward in the vehicle-width direction, and the side wall 78 of the front body mount 70, which faces forward in the vehicle front-rear direction.

Furthermore, an upper surface of the lower wall 86 of the body mount bracket 80 is overlapped with a lower surface of a right side portion of a front portion of the lower flange 42 of the reinforcing panel 40. A rear end of the lower wall 86 is joined to the lower surface of the lower flange 42 of the reinforcing panel 40 by a welded portion 118. An end portion of the lower wall 86 of the body mount bracket 80 is joined to the side walls 74, 78 of the front body mount 70 by a welded portion 120.

As a result, the bottom wall 72 of the front body mount 70 is joined to the lower wall of the reinforcing panel 40, and the side walls 74, 76, 78 of the front body mount 70 are joined to the upper panel 50 and the body mount bracket 80. That is, the front body mount 70 and the cross member 20 are firmly joined together, and high rigidity is secured.

Here, resonance between the cross member 20 and the engine will be described. As described above, the torque rod is fixed to the cross member 20, and vibration of the engine is input into the cross member 20. Therefore, it is required that the natural frequency of the cross member 20 be made higher than the general frequency of the engine to prevent resonance between the cross member 20 and the engine.

Since the cross member 20 according to the present embodiment is reinforced by the intermediate wall 44 of the reinforcing panel 40 and has increased rigidity, as illustrated in, for example, FIG. 5, the natural frequency of the cross member 20 can be set relatively high. If the intermediate wall 44 is not provided, the cross member 20 has a large substantially-rectangular parallelepiped shape having a single hollow portion 22. In this case, the cross member 20 has a natural vibration mode where a spatial scale in which the entire upper wall and lower wall vibrate is large, and the natural frequency is relatively small (the vibration period is long). However, in actuality, the cross member 20 is provided with the intermediate wall 44, whereby movements of the upper wall and the lower wall are restricted, and the rigidity of the cross member 20 is increased by the intermediate wall 44. Thus, the spatial scale of the natural vibration mode is small, and the natural frequency is relatively large. This phenomenon can be understood from the fact that a large drum sounds with a low pitch, while a small drum sounds with a high pitch.

Further, the opposite side portions of the front portion of the cross member 20 are joined to the front body mounts 70, and the cross member 20 is mounted in the vehicle in a state where the cross member 20 is suspended by the front body mounts 70. Therefore, the cross member 20 has a natural vibration mode where the cross member 20 vibrates between the front body mounts 70 provided respectively on the opposite sides of the cross member 20. However, the cross member 20 and each front body mount 70 are firmly fixed at a plurality of locations, and the rigidity is increased. Therefore, the natural frequency of the cross member 20 that vibrates between the front body mounts 70 is relatively large. This phenomenon can be understood from the fact that strings of a guitar stretched to a certain length are increased in pitch by increasing a tension.

As described above, the cross member 20 has a structure in which the natural frequency is increased from two viewpoints. Therefore, the resonance between the cross member 20 and the engine can be restrained or prevented.

In the above description, the structure of the cross member 20 has been described with reference to FIG. 2 to FIG. 4 or FIG. 7 to FIG. 11, and the members are sequentially assembled to the lower panel 30. However, the assembling order of the cross member 20 in the descriptions is just an example, and the assembling can be performed in various other orders. In addition, it should be noted that the assemblies 130, 132, 134, 136 are partially segments of the joining structure achieved in the cross member 20.

Further, in the foregoing description, the lower flange 42 of the reinforcing panel 40 constitutes the front portion of the lower wall of the cross member 20. However, a structure in which the lower flange 42 constitutes the rear portion of the lower wall of the cross member 20 may be adopted.

Furthermore, in the foregoing description, the structure of the cross member 20 is applied to the suspension member 10. Alternatively, the structure of the cross member 20 may be applied to a suspension member provided in a rear portion of a vehicle. For example, the structure of the cross member 20 may be applied to a rear suspension having a configuration that is obtained by rotating a front suspension by 180 degrees in a horizontal plane.

What is claimed is:

1. A suspension member provided in a vehicle, the suspension member comprising a cross member and body mounts, wherein
    the cross member includes a main panel and a reinforcing panel that have been joined together, and the cross member includes a front wall, an upper wall, a rear wall, and a lower wall and having a closed sectional shape defined by the front wall, the upper wall, the rear wall, and the lower wall,
    the reinforcing panel includes a flange that constitutes a part of the lower wall, and an intermediate wall that extends upward from a rear end of the flange and that is joined to the upper wall, and
    on opposite sides of the cross member in a vehicle-width direction, bottom walls of the body mounts are joined to the flange of the reinforcing panel, and side walls of the body mounts are joined to the main panel.

2. The suspension member according to claim 1, wherein:
    the body mounts are front body mounts provided at a front portion of the cross member,
    the flange of the reinforcing panel constitutes a front portion of the lower wall, and
    the intermediate wall of the reinforcing panel is disposed rearward of rear walls of the front body mounts at all positions between the front body mounts disposed on the opposite sides of the cross member.

3. The suspension member according to claim 2, wherein a front end of the flange of the reinforcing panel is disposed forward of rear side surfaces of the front body mounts at all the positions between the front body mounts disposed on the opposite sides of the cross member.

4. The suspension member according to claim 1, wherein:
    the flange of the reinforcing panel constitutes a front portion of the lower wall,
    the main panel includes the front wall, the upper wall, the rear wall, and a rear portion of the lower wall,
    a portion of the flange of the reinforcing panel, the portion of the flange being near the rear end of the flange, is joined to a portion of the rear portion of the lower wall of the main panel, the portion of the rear portion of the lower wall being near a front end of the rear portion of the lower wall, and
    a portion of the flange of the reinforcing panel, the portion of the flange being near a front end of the flange, is joined to a portion of the front wall of the main panel, the portion of the front wall being near a lower end of the front wall.

5. The suspension member according to claim 1, further comprising body mount brackets joined respectively to front side surfaces of the body mounts,
    wherein the body mount brackets are joined to the main panel and the reinforcing panel.

* * * * *